(12) United States Patent
Choi et al.

(10) Patent No.: US 10,271,296 B2
(45) Date of Patent: Apr. 23, 2019

(54) METHOD FOR CHANGING SCHEDULE INFORMATION IN WIRELESS COMMUNICATION SYSTEM AND DEVICE THEREFOR

(71) Applicant: LG ELECTRONICS INC., Seoul (KR)

(72) Inventors: Heedong Choi, Seoul (KR); Seongyun Kim, Seoul (KR); Hongbeom Ahn, Seoul (KR); Seungmyeong Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 58 days.

(21) Appl. No.: 15/515,730

(22) PCT Filed: Dec. 23, 2014

(86) PCT No.: PCT/KR2014/012719
§ 371 (c)(1),
(2) Date: Mar. 30, 2017

(87) PCT Pub. No.: WO2016/064029
PCT Pub. Date: Apr. 28, 2016

(65) Prior Publication Data
US 2017/0303227 A1     Oct. 19, 2017

Related U.S. Application Data

(60) Provisional application No. 62/067,447, filed on Oct. 23, 2014.

(51) Int. Cl.
*H04W 60/00*     (2009.01)
*H04W 4/70*     (2018.01)
(Continued)

(52) U.S. Cl.
CPC ............ *H04W 60/00* (2013.01); *H04L 67/12* (2013.01); *H04L 67/16* (2013.01); *H04W 4/70* (2018.02); *H04W 8/18* (2013.01)

(58) Field of Classification Search
CPC ......... H04W 4/70; H04W 8/18; H04W 60/00; H04W 4/00
(Continued)

(56) References Cited

U.S. PATENT DOCUMENTS 7,107,610 B2 *   9/2006   Lortz ..................... H04L 63/08
                                                                              709/223
9,071,925 B2 *   6/2015   Viswanathan ........ H04W 4/005
(Continued)

FOREIGN PATENT DOCUMENTS

KR        10-1191220 B1     10/2012
KR   10-2014-0082693 A      7/2014
(Continued)

*Primary Examiner* — Man U Phan
(74) *Attorney, Agent, or Firm* — Birch, Stewart, Kolasch & Birch, LLP

(57) ABSTRACT

A method for changing schedule information in a wireless communication system according to an embodiment of the present invention is performed by a first M2M device and may comprise the steps of: receiving, from a second M2M device, a request for registering schedule information on a particular application; checking whether the schedule information on the particular application is included in schedule information of the first M2M device; if the schedule information on the particular application is not included in the schedule information on the first M2M device, checking whether a policy related to the schedule information of the first M2M device exists; if the policy exists, determining whether the states of the first M2M device and the second M2M device satisfy the policy; and if the states of the first M2M device and the second M2M device satisfy the policy, updating the schedule information of the first M2M device.

10 Claims, 11 Drawing Sheets

(51) Int. Cl.
*H04W 8/18* (2009.01)
*H04L 29/08* (2006.01)

(58) Field of Classification Search
USPC .......................................................... 370/328
See application file for complete search history.

(56) References Cited

U.S. PATENT DOCUMENTS

| | | | | |
|---|---|---|---|---|
| 9,197,639 | B2* | 11/2015 | Kim | H04W 12/04 |
| 9,262,242 | B2* | 2/2016 | Stansell | G06F 9/546 |
| 9,313,644 | B2* | 4/2016 | Lamberton | H04W 8/06 |
| 9,596,557 | B2* | 3/2017 | Aon | H04W 4/70 |
| 9,800,999 | B2* | 10/2017 | Ahn | H04W 4/70 |
| 9,883,320 | B2* | 1/2018 | Kim | H04W 4/70 |
| 9,906,889 | B2* | 2/2018 | Choi | H04W 4/70 |
| 2014/0189075 | A1 | 7/2014 | Stansell et al. | |
| 2014/0247795 | A1* | 9/2014 | Kim | H04W 72/042 |
| | | | | 370/329 |
| 2016/0242229 | A1* | 8/2016 | Balachandran | H04W 4/70 |
| 2016/0302069 | A1* | 10/2016 | Kim | H04L 9/32 |
| 2017/0311112 | A1* | 10/2017 | Seed | H04W 4/70 |

FOREIGN PATENT DOCUMENTS

| | | | |
|---|---|---|---|
| WO | WO 2013/176425 | A1 | 11/2013 |
| WO | WO 2014/129802 | A1 | 8/2014 |

* cited by examiner

METHOD FOR CHANGING SCHEDULE INFORMATION IN WIRELESS COMMUNICATION SYSTEM AND DEVICE THEREFOR

CROSS REFERENCE TO RELATED APPLICATIONS

This application is the National Phase of PCT International Application No. PCT/KR2014/012719, filed on Dec. 23, 2014, which claims priority under 35 U.S.C. 119(e) to U.S. Provisional Application No. 62/067,447, filed on Oct. 23, 2014, all of which are hereby expressly incorporated by reference into the present application.

TECHNICAL FIELD

The present invention relates to a wireless communication system and, more particularly, to a method of changing scheduling information and an apparatus therefor.

BACKGROUND ART

In the era of ubiquitous computing, machine-to-machine (M2M) communication has attracted much attention. M2M communication technology is under study in many standardization organizations such as TIA, ATIS, ETSI, and oneM2M. In an M2M environment, communication occurs between a plurality of M2M related applications (e.g., a network application, a gateway application, and a device application) and different entities may manage an M2M platform or framework (e.g., a common service entity (CSE)) and an application on a network side (e.g., a network application).

In addition, the CSE and each of the applications configures schedule information for operation thereof. However, if the CSE operating as a gateway and individual applications registered to the CSE and driven do not have common scheduling information, the applications will not be properly executed.

In this context, the present invention is intended to provide an improved method for schedule control in an M2M system.

DISCLOSURE

Technical Problem

The present invention provides a method of changing scheduling information and an apparatus therefor.

The technical objects that can be achieved through the present invention are not limited to what has been particularly described hereinabove and other technical objects not described herein will be more clearly understood by persons skilled in the art from the following detailed description.

Technical Solution

According to an embodiment of the present invention, provided herein is a method for changing scheduling information in a wireless communication system. The method may be performed by a first machine-to-machine (M2M) device and may include receiving a registration request of scheduling information for a specific application from a second M2M device; checking whether the scheduling information for the specific application is included in scheduling information of the first M2M device; if the scheduling information for the specific application is not included in the scheduling information of the first M2M device, inspecting whether a policy related to the scheduling information of the first M2M device is present; if the policy is present, determining whether states of the first M2M device and the second M2M device satisfy the policy; and if the states of the first M2M device and the second M2M device satisfy the policy, updating the scheduling information of the first M2M device.

Additionally or alternatively, the policy related to the scheduling information of the first M2M device may include schedulePermission indicating information about an identifier of an entity having privilege to change the scheduling information of the first M2M device, a class of the identifier, or a time when the entity indicated by the identifier can change the scheduling information, batteryLimitation indicating a battery state value of the first M2M device which can change the scheduling information, or additionalCondition indicating an additional condition under which the scheduling information can be changed.

Additionally or alternatively, the class of the identifier may include a first class and a second class, the first class may indicate that the entity corresponding to the identifier can change the scheduling information without considering a policy related to other scheduling information, and the second class may indicate that the entity corresponding to the identifier can change the scheduling information in consideration of a policy related to other scheduling information.

Additionally or alternatively, the policy related to the scheduling information of the first M2M device may include revokeCondition indicating the scheduling information of the first M2M device that is to be changed when the states of the first M2M device and the second M2M device do not satisfy the policy after the scheduling information of the first M2M device is updated according to the registration request.

Additionally or alternatively, the method may further include, if the scheduling information for the specific application is included in the scheduling information of the first M2M device, accepting the registration request and transmitting, to the second M2M device, a response message indicating that the scheduling information for the specific application has been registered according to the registration request.

Additionally or alternatively, the method may further include, if the states of the first M2M device and the second M2M device do not satisfy the policy or the policy is not present, accepting the registration request and transmitting a response message including information about a period during which the first M2M device does not operate.

Additionally or alternatively, the method may further include, if the states of the first M2M device and the second M2M device do not satisfy the policy after the scheduling information of the first M2M device is updated according to the registration request, changing the scheduling information of the first M2M device as indicated by a revokeCondition.

In another aspect of the present invention, provided herein is a machine-to-machine (M2M) device for changing scheduling information in a wireless communication system. The M2M device may include a radio frequency (RF) unit; and a processor configured to control the RF unit. The processor may be configured to receive a registration request of scheduling information for a specific application from a peer M2M device, check whether the scheduling information for the specific application is included in scheduling information of the M2M device, if the scheduling information for the specific application is not included in the scheduling information of the M2M device, inspect whether a policy related to the scheduling information of the M2M device is present, if the policy is present, determine whether states of the M2M device and the peer M2M device satisfy the policy, and if the states of the M2M device and the peer M2M device satisfy the policy, update the scheduling information of the M2M device.

Additionally or alternatively, wherein the policy related to the scheduling information of the M2M device may include schedulePermission indicating information about an identifier of an entity having privilege to change the scheduling information of the M2M device, a class of the identifier, or a time when the entity indicated by the identifier can change the scheduling information, batteryLimitation indicating a battery state value of first M2M device which can change the scheduling information, or additionalCondition indicating an additional condition under which the scheduling information can be changed.

Additionally or alternatively, the class of the identifier may include a first class and a second class, the first class may indicate that the entity corresponding to the identifier can change the scheduling information without considering a policy related to other scheduling information, and the second class may indicate that the entity corresponding to the identifier can change the scheduling information in consideration of a policy related to other scheduling information.

Additionally or alternatively, the policy related to the scheduling information of the M2M device may include revokeCondition indicating the scheduling information of the M2M device that is to be changed when the states of the M2M device and the peer M2M device do not satisfy the policy after the scheduling information of the M2M device is updated according to the registration request.

Additionally or alternatively, if the scheduling information for the specific application is included in the scheduling information of the M2M device, the processor may be configured to accept the registration request and transmit, to the peer M2M device, a response message indicating that the scheduling information for the specific application has been registered according to the registration request.

Additionally or alternatively, if the states of the first M2M device and the second M2M device do not satisfy the policy or the policy is not present, the processor may be configured to accept the registration request and transmit a response message including information about a period during which the M2M device does not operate.

Additionally or alternatively, if the states of the first M2M device and the second M2M device do not satisfy the policy after the scheduling information of the M2M device is updated according to the registration request, the processor may be configured to change the scheduling information of the M2M device as indicated by a revokeCondition.

The above technical solutions are merely some parts of the embodiments of the present invention and various embodiments into which the technical features of the present invention are incorporated can be derived and understood by persons skilled in the art from the following detailed description of the present invention.

Advantageous Effects

According to an embodiment of the present invention, an operation of an application can be efficiently performed by changing scheduling information in a wireless communication system.

The effects that can be achieved through the present invention are not limited to what has been particularly described hereinabove and other advantages of the present invention will be more clearly understood by persons skilled in the art from the following detailed description.

DESCRIPTION OF DRAWINGS

The accompanying drawings, which are included to provide a further understanding of the invention, illustrate embodiments of the invention and together with the description serve to explain the principle of the invention.

BEST MODE

Reference will now be made in detail to the preferred embodiments of the present invention, examples of which are illustrated in the accompanying drawings. The following detailed description of the invention includes details to aid in full understanding of the present invention. Those skilled in the art will appreciate that the present invention can be implemented without these details.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

In the present disclosure, devices for device-to-device communication, that is, M2M devices, may be fixed or mobile and include devices which communicate with a server for device-to-device communication, that is, an M2M server to transmit/receive user data and/or various types of control information. The M2M devices may be referred to as terminal equipment, mobile stations (MSs), mobile terminals (MTs), user terminals (UTs), subscriber stations (SSs), wireless devices, personal digital assistants (PDA), wireless modems, handheld devices and the like. In the present invention, the M2M server refers to a fixed station which communicates with M2M devices and/or other M2M servers, and exchanges various types of data and control information with M2M devices and/or other M2M servers by communicating with the M2M devices and/or other M2M servers.

A description will be given of technology associated with the present invention.

M2M Applications

These are applications that execute service logic and use a common service entity (CSE) accessible through an open interface. The M2M applications can be installed in an M2M device, an M2M gateway or an M2M server.

M2M Service

This is a set of functions that can be used by the M2M CSE through standardized interfaces.

oneM2M defines a common M2M service framework (or service platform, CSE or the like) for various M2M applications (or application entities (AEs)). M2M applications can be considered as software implementing service logic such as e-Health, City Automation, Connected Consumer and Automotive. The oneM2M service framework includes functions commonly necessary to implement various M2M applications. Accordingly, it is possible to easily implement various M2M applications using the oneM2M service framework without configuring frameworks necessary for the respective M2M applications. This can integrate M2M markets currently divided into many M2M verticals, such as smart building, smart grid, e-Heath, transportation and security, and thus remarkable growth of the M2M markets is expected.

Figure 1:
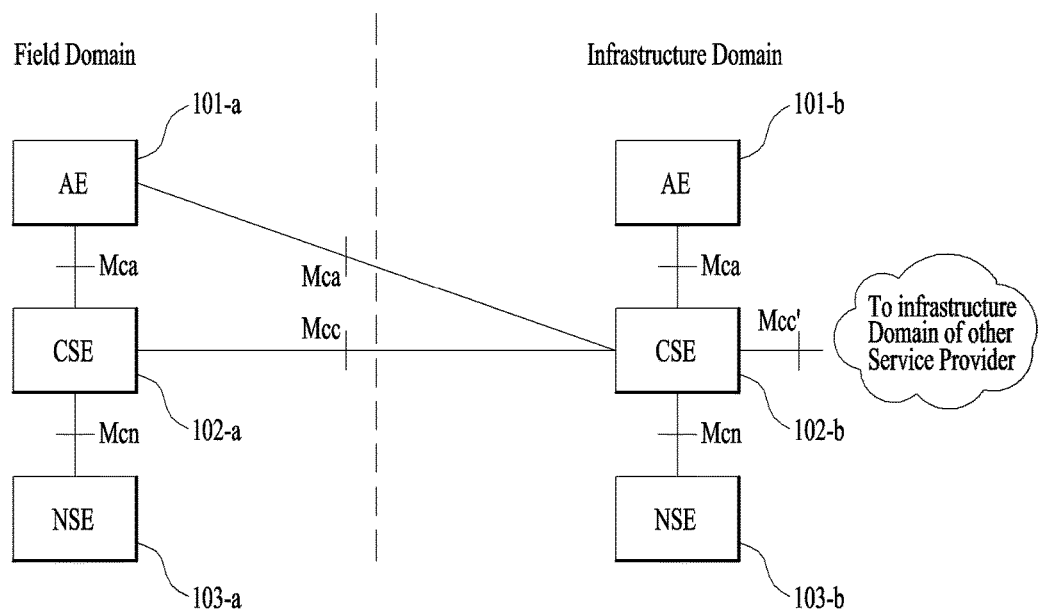
FIG. 1 illustrates a functional structure of an M2M communication system.

FIG. 1 illustrates the architecture of an M2M communication system. Each entity will now be described.

Application entity (AE, 101): Application entity provides application logic for end-to-end M2M solutions. Examples of the application entity include fleet tracking application, remote blood sugar monitoring application, remote power metering and controlling application.

Common service entity (CSE, 102): CSE comprises the set of "service functions" that are common to M2M environments and specified by oneM2M. Such service functions are exposed to AEs and other CSEs through reference points X and Y and used by the AEs and other CSEs. The reference point Z is used for accessing underlying network service entities.

Examples of the service functions provided by the CSE include data management, device management, M2M subscription management and location service. These functions can be logically classified into common service functions (CSFs). Some CSFs in the CSE are mandatory and some may be optional. Further, some functions in the CSFs are mandatory and some functions may be optional (e.g. some of application software installation, firmware update, logging and monitoring functions in "device management" CSF are mandatory functions and some are optional functions.)

Underlying network service entity (NSE, 103): provides services to the CSEs. Examples of such services include device management, location services and device triggering. No particular organization of the NSEs is assumed. Note: underlying networks provide data transport services between entities in the oneM2M system. Such data transport services are not included in the NSE.

The reference points shown in FIG. 1 will now be described.

Mca Reference Point

This is the reference point between an AE and a CSE. The Mca reference point allows the CSE to communicate with the AE such that the AE can use the services provided by the CSE.

The services provided through the Mca reference point are dependent on the functionality supported by the CSE. The AE and the CSE may or may not be co-located within the same physical entity.

Mcc Reference Point

This is the reference point between two CSEs. The Mcc reference point allows a CSE to use the services of another CSE in order to fulfill needed functionality. Accordingly, the Mcc reference point between two CSEs is supported over different M2M physical entities. The services offered via the Mcc reference point are dependent on the functionality supported by the CSEs.

Mcn Reference Point

This is the reference point between a CSE and an NSE. The Mcn reference point allows a CSE to use the services (other than transport and connectivity services) provided by the NSE in order to fulfill the needed functionality. It means services other than simple service such as transport and connectivity, for example, services such as device triggering, small data transmission and positioning.

Mcc' Reference Point

This is the reference point is used for communication between CSEs respectively belongs to different M2M service providers. Mcc' references point is similar to Mcc reference point in respect of connecting CSEs each other, but Mcc' reference point expands Mcc reference point to different M2M service providers while Mcc reference point is limited to communication in a single M2M service provider.

Figure 2:
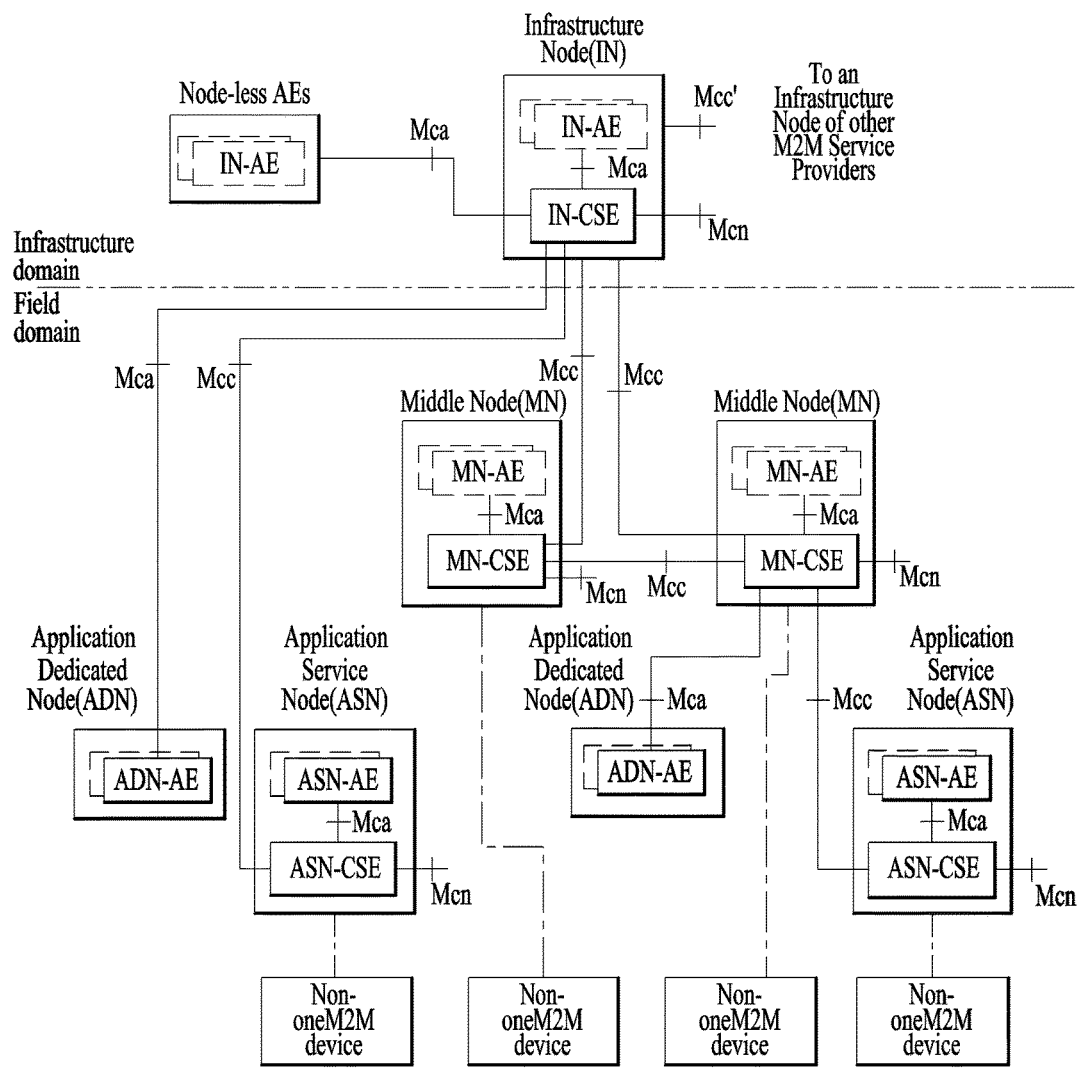
FIG. 2 illustrates a configuration supported by an M2M communication system based on an M2M functional structure.

FIG. 2 illustrates compositions supported by M2M communication system based on the architecture. The M2M communication system may support more various compositions without being limited to the illustrated compositions. A concept, which is called to node, important for understand the illustrated compositions will be explained.

Application Dedicated Node (ADN): An application dedicated node is a node that contains at least oneM2M application and does not contain a CSE. The ADN can communicate over an Mca reference point with one middle node or one infrastructure node. The ADN can be present in an M2M device.

Application Service Node (ASN): An application service node is a node that contains at least one CSE and has at least oneM2M application. The ASN can communicate over a Mcc reference point with one middle node or one infrastructure node. The ASN can be present in an M2M device.

Middle Node (MN): A middle node is a node that contains at least one CSE and may contain M2M applications. The middle node communicates over a Mcc references point with at least two nodes belonging to the following different category:

one or more ASNs;
one or more middle nodes (MNs); and
one infrastructure structure.

The MN can be connected with the ADN through an Mca reference point. The MN can be present in an M2M gateway.

Infrastructure Node (IN): An infrastructure node is a node that contains one CSE and may contain application entities (AEs). The IN can be present in M2M server.

The IN communicates over a Mcc reference point with either:

one or more middle nodes; and/or
one or more application service nodes.

The IN may communicate with one or more ADNs over one or more Mca reference points.

Figure 3:
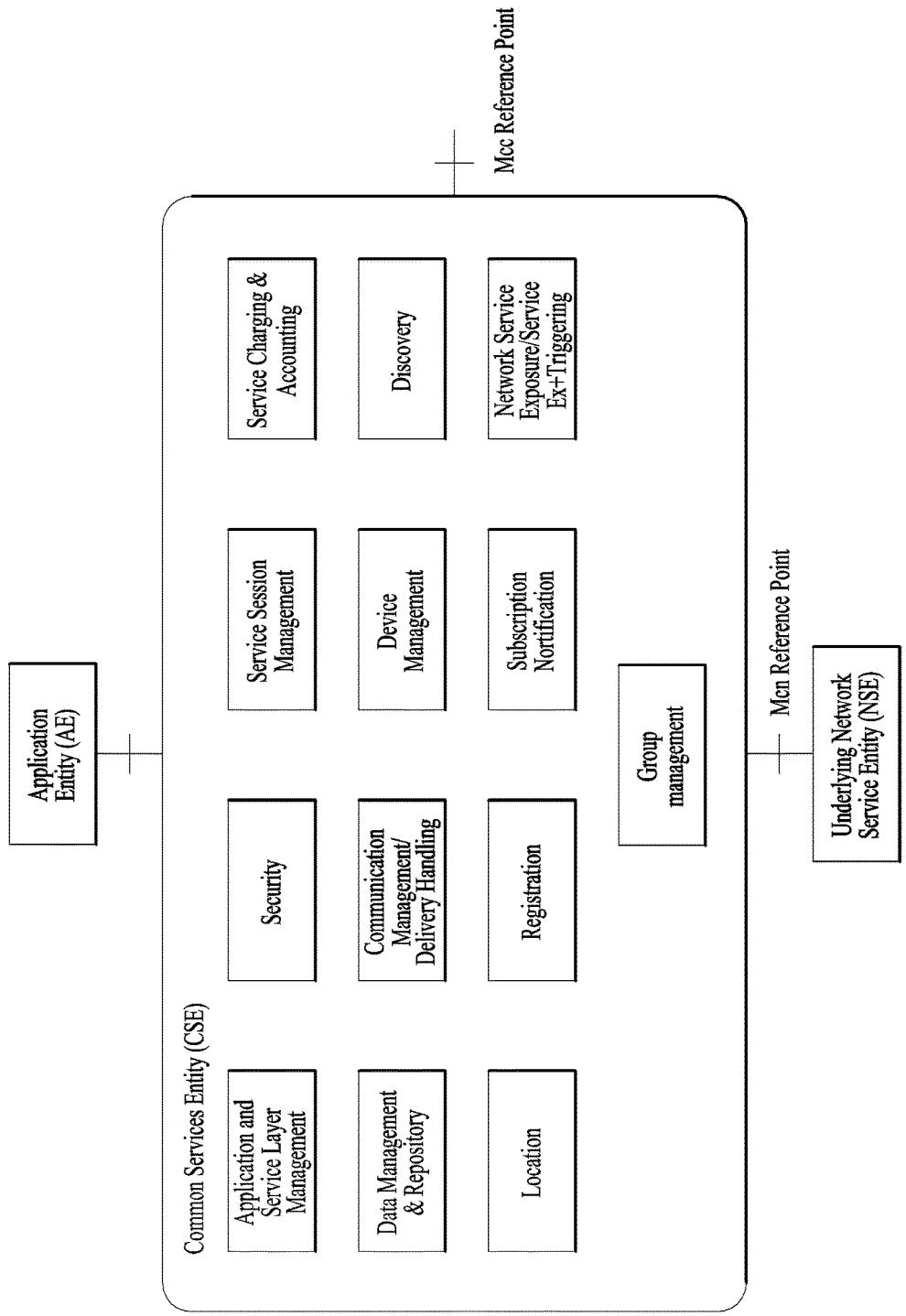
FIG. 3 illustrates common service functions provided by an M2M communication system.

FIG. 3 illustrates M2M service functions in the M2M communication system.

M2M service functions (i.e. common service functions) provided by the oneM2M service framework include "Communication Management and Delivery Handling", "Data Management and Repository", "Device Management", "Discovery", "Group Management", "Addressing and Identification", "Location", "Network Service Exposure, Service Execution and Triggering", "Registration", "Security", "Service Charging and Accounting", "Session Management" and "Subscription and Notification.", as shown in FIG. 3.

A brief description will be given of each M2M service function.

Communication Management and Delivery Handling (CMDH): this provides communications with other CSEs, AEs and NSEs and delivers messages.

Data Management and Repository (DMR): this enables M2M applications to exchange and share data.

Device Management (DMG): this manages M2M devices/gateways. Specifically, the device management function includes installation and setting of applications, determination of set values, firmware update, logging, monitoring, diagnostics, topology management, etc.

Discovery (DIS): this discovers resources and information based on conditions.

Group Management (GMG): this processes a request related to a group that may be generated by grouping resources, M2M devices or gateways.

Addressing and Identification (AID): this identifies and addresses physical or logical resources.

Location (LOC): this enables M2M applications to obtain position information of an M2M device or gateway.

Network Service Exposure, Service Execution and Triggering (NSE): this enables communication of an underlying network and use of functions provided by the underlying network.

Registration (REG): this handles registration of an M2M application or another CSE with a specific CSE. Registration is performed in order to use M2M service functions of the specific CSE.

Security (SEC): this performs handling of sensitive data such as a security key, association establishment, authentication, authorization, identity protection, etc.

Service Charging and Accounting (SCA): this provides a charging function to CSEs.

Session Management (SM): this manages an M2M session for end-to-end communication.

Subscription and Notification (SUB): this notifies change of a specific resource when the change of the specific resource is subscribed.

The M2M service functions are provided through CSE, and AE (or, M2M applications) may use through Mca reference point, or other CSE may use the M2M service functions through Mcc reference point. Also, the M2M service functions may be operated synchronized with underlying network (or underlying network service entity (NSE) such as 3GPP, 3GPP2, Wi-Fi, Bluetooth).

All oneM2M devices/gateways/infrastructures do not have higher functions and may have mandatory functions and some optional functions from among the corresponding functions.

The term "resource" in the M2M communication system may be used to construct and express information in the M2M communication system, and may indicate all kinds of things capable of being identified by URI. The resource may be classified into a general resource, a virtual resource, and an announced resource. Respective resources can be defined as follows.

Virtual Resource: The virtual resource may trigger specific processing, and/or may perform retrieving of the result. The virtual resource is not permanently contained in CSE.

Announced Resource: The announced resource is a resource contained in the resource CSE connected to the announced (or notified) original resource. The announced resource may maintain some parts of the characteristics of the original resource. The resource announcement may facilitate the resource searching or discovery. The announced resource contained in the remote CSE is not present as a child of the original resource in the remote CSE, or may be used to generate child resources instead of the announced child of the original resource.

General resource: If this resource is not designated as the virtual or announced resource, the corresponding resource is a general resource.

Figure 4:
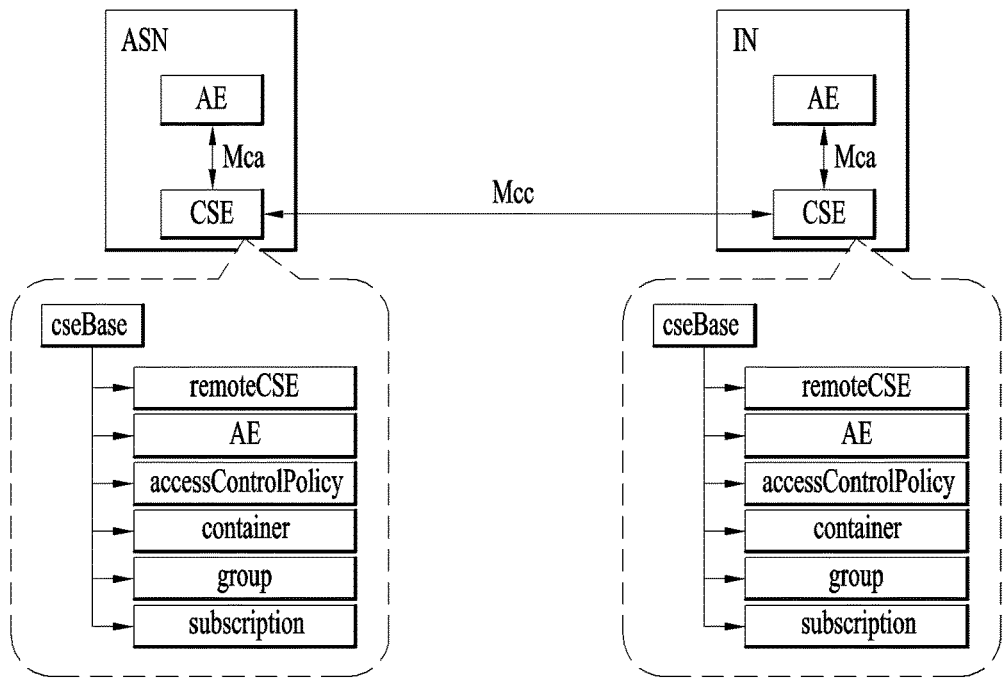
FIG. 4 illustrates resource structures in an M2M application service node and an M2M infrastructure node.

FIG. 4 illustrates structures of resources present in an M2M application service node and an M2M infrastructure node.

The M2M architecture defines various resources. M2M services for registering applications and reading sensor values can be performed by operating the resources. The resources are configured in one tree structure and may be logically connected to the CSE or stored in the CSE to be stored in M2M devices, M2M gateways, network domains and the like. Accordingly, the CSE can be referred to as an entity that manages resources. The resources have a <cseBase> as a tree root. Representative resources are described below.

<cseBase> resource: this is a root resource of oneM2M resources configured in a tree and includes all other resources.

<remoteCSE> resource: this belongs to <cseBase> resource and includes information on other CSE being connected or registered to corresponding CSE.

<AE> resource: this is a resource that is lower than <cseBase> or <remoteCSE> resource, and stores information on applications registered (connected) with the corresponding CSE when present under <cseBase> resource, and stores information on applications registered with other CSEs (in the name of CSE) when present under <remoteCSE> resource.

<accessControlPolicy> resource: this stores information associated with access rights to specific resources. Authentication is performed using access rights information included in this resource.

<container> resource: this is a resource that is lower than containers and stores data per CSE or AE.

<group> resource: this is a resource that is lower than groups and provides a function of grouping a plurality of resources and simultaneously processing the grouped resources.

<subscription> resource: this is a resource that is lower than subscriptions and executes a function of announcing a state change such as a resource value change through notification.

Figure 5:
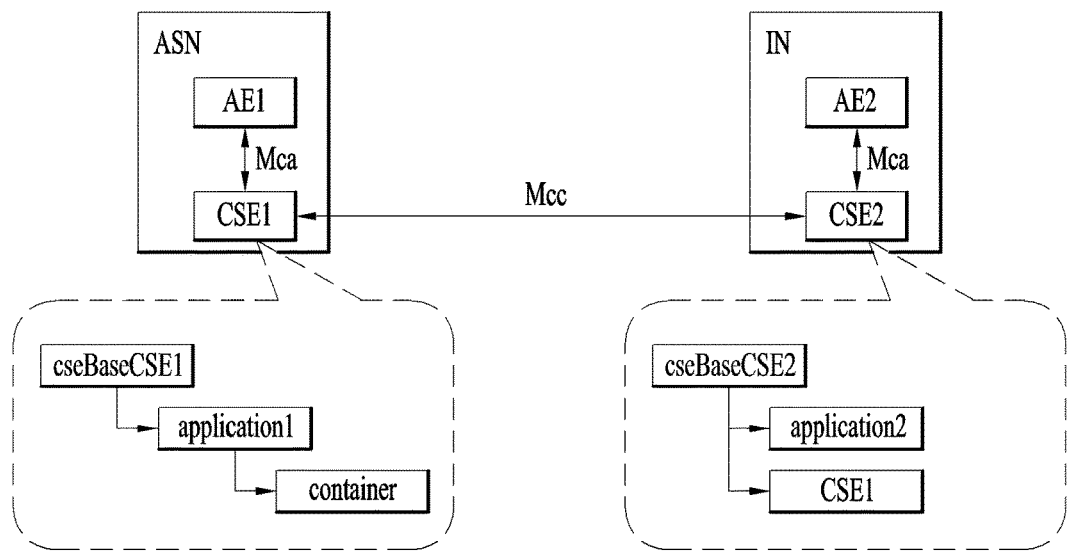
FIG. 5 illustrates resource structures in an M2M application service node (e.g., an M2M device) and an M2M infrastructure node.

FIG. 5 illustrates structures of resources present in an M2M application service node (e.g. M2M device) and an M2M infrastructure node.

A description will be given of a method by which an AE (application 2) registered with the M2M infrastructure node reads a value of a sensor of the M2M device. The sensor refers to a physical device, in general. An AE (application 1) present in the M2M device reads a value from the sensor and stores the read value in the form of a container resource in a CSE (CSE 1) in which the AE (application 1) has registered. To this end, the AE present in the M2M device needs to be pre-registered with the CSE present in the M2M device. Upon completion of registration, registered M2M application related information is stored in the form of cseBaseCSE1/application1 resource, as shown in FIG. 5.

When the sensor value is stored, by the AE present in the M2M device, in a container resource lower than the cseBaseCSE1/application1 resource, the AE registered with the infrastructure node can access the corresponding value. To enable access, the AE registered with the infrastructure node also needs to be registered with a CSE (CSE 2) of the infrastructure node. Registration of the AE is performed by storing information about application 2 in cseBaseCSE2/application2 resource as application 1 is registered with CSE 1. Application 1 communicates with application 2 via CSE 1 and CSE 2 instead of directly communicating with application 2. To this end, CSE 1 needs to be pre-registered with CSE 2. When CSE 1 registers with CSE 2, CSE 1 related information (e.g. Link) is stored in the form of <remoteCSE> resource lower than cseBaseCSE2 resource. That is, <remoteCSE> provides a CSE type, access address (IP address and the like), CSE ID, and reachability information about the registered CSE.

Resource discovery refers to a process of discovering resources present in a remote CSE. Resource discovery is performed through a retrieve request and the retrieve request for resource discovery includes the following.

<startURI>: this indicates a URI. The URI can be used to limit the range of resources to be discovered. If <startURI> indicates a resource root <cseBase>, resource discovery is performed on all resources of a receiver that has received the retrieve request. The receiver performs resource discovery only on a resource indicated by <startURI> and a lower resource thereof.

filterCriteria: this information describes information related to a resource to be discovered. The receiver searches the resources within a discovery range defined by <startURI> for a resource that satisfies filterCriteria and transmits the resource to a requester of the corresponding request.

As illustrated in FIGS. 4 and 5, resources are represented as a tree structure in the M2M system, and a root resource type is represented as a <CSEBase>. Accordingly, <CSEBase> resource type must be exist when a common service entity (CSE) exists.

Figure 6:
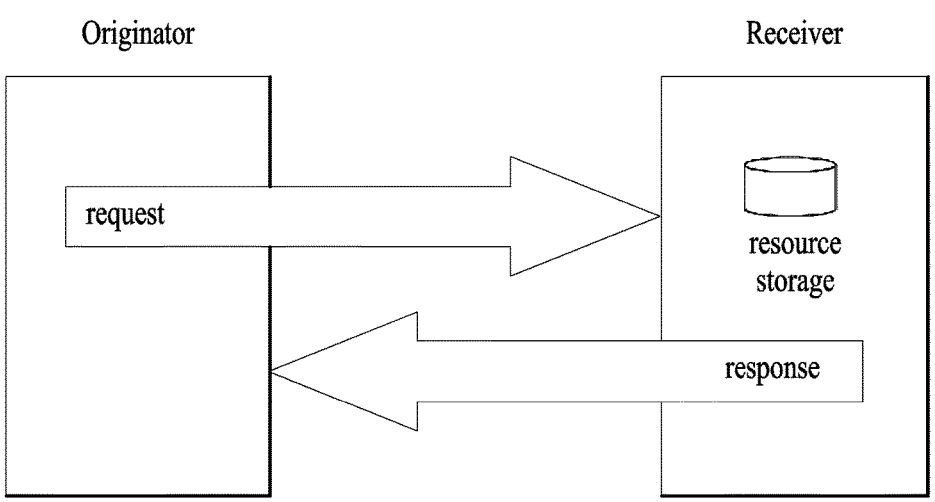
FIG. 6 illustrates a procedure of exchanging request and response messages used in a wireless communication system.

FIG. 6 is a conceptual diagram illustrating a general communication flow located at Mca and Mcc reference points. The M2M system operation is carried out on the basis of data exchanging. For example, in order to allow a first device to transmit or perform a command for stopping a specific operation of a second device, the first device must transmit the corresponding command (configured in a data form) to the second device. In the M2M system, data can be exchanged using the request and response messages during communication between the application (or CSE) and another CSE.

The request message may include the following information.
- op: "op" means the shape of an operation to be carried out. (This information may be selected from among Create, Retrieve, Update, Delete, and Notify.)
- to: "to" means an ID (i.e., ID of the receiver) of an entity scheduled to receive the request.
- fr: "fr" means an ID of a calling user (i.e., call originator) who generates the request.
- ri: "ri" means an ID (i.e., ID used to discriminate the request message) of the request message
- mi: "mi" means additional information (i.e., meta information) regarding the corresponding request.
- cn: "cn" means content of resources to be transmitted.

The response message may include the following information. If the corresponding request message is successfully processed, the response message may include the following information.
- to: "to" means an ID of a calling user (i.e., a call originator) who generates the request message.
- fr: "fr" means an ID of a called person (i.e., a call receiver) who receives the request message.
- ri: "ri" means an ID of the request message used to identify the ID of the request message.
- mi: "mi" means additional information (i.e., meta information) regarding the corresponding request.
- rs: "rs" means the processed result (for example, Okay, Okay and Done, Okay and in progress) of the request message.
- ai: "ai" means additional information.
- cn: "cn" means content of resources to be transmitted (only the resultant value (rs) can be transmitted.)

If the request message processing is failed, the response message may include the following information.
- to: "to" means an ID of a calling user (i.e., a call originator) who generates the request message.
- fr: "fr" means an ID of a called person (i.e., a call receiver) who receives the request message.
- ri: "ri" means an ID of the request message (so as to identify the ID of the request message).
- mi: "mi" means additional information (i.e., meta information) regarding the corresponding request.
- rs: "rs" means the processed result (for example, Not Okay) of the request message.
- ai: "ai" means additional information.

Meanwhile, various resource types are described in a following table.

TABLE 1

| Resource Type | Short Description | Child Resource Types | Parent Resource Types |
| --- | --- | --- | --- |
| AE | Stores information about the AE. It is created as a result of successful registration of an AE with the registrar CSE. | subscription, container, group, accessControlPolicy, mgmtObj, commCapabilities, pollingChannel | remoteCSE, CSEBase |
| cmdhNwAccessRule | Defines a rule for the usage of underlying networks. | schedule subscription | cmdhNetworkAccessRules |

TABLE 1-continued

| Resource Type | Short Description | Child Resource Types | Parent Resource Types |
|---|---|---|---|
| CSEBase | The structural root for all the resources that are residing on a CSE. It shall store information about the CSE itself. | remoteCSE, node, application, container, group, accessControlPolicy, subscription, mgmtObj, mgmtCmd, locationPolicy, statsConfig | None |
| group | Stores information about resources of the same type that need to be addressed as a Group. Operations addressed to a Group resource shall be executed in a bulk mode for all members belonging to the Group. | fanOutPoint subscription | Application, remoteCSE, CSEBase |
| locationPolicy | Includes information to obtain and manage geographical location. It is only referred from container, the contentInstances of the container provides location information. | subscription | CSEBase |
| remoteCSE | Represents a remote CSE for which there has been a registration procedure with the registrar CSE identified by the CSEBase resource. | application, container, group, accessControlPolicy, subscription, mgmtObj, pollingChannel, node | CSEBase |
| subscription | Subscription resource represents the subscription information related to a resource. Such a resource shall be a child resource for the subscribe-to resource. | schedule | accessControlPolicy, application, cmdhBuffer, cmdhDefaults, cmdhEcDefParamValues, cmdhDefEcValue, cmdhLimits, cmdhNetworkAccessRules, cmdhNwAccessRule, cmdhPolicy, container, CSEBase, delivery, eventConfig, execInstance, group, contentInstance, locationPolicy, mgmtCmd, mgmtObj, m2mServiceSubscription, node, nodeInfo, parameters, remoteCSE, request, schedule, statsCollect, statsConfig |
| schedule | Contains scheduling information for delivery of messages. | subscription | node, subscription, cmdhNwAccessRule |

Each resource type may be located below the parent resource type of the corresponding resource type, and may have a child resource type. In addition, each resource type may have attributes, and actual values may be stored in the attributes.

Among the resource types listed in the above table, the <schedule> resource type will now be described in more detail.

The <schedule> resource includes scheduling information. The usage of the <schedule> resource is slightly different depending on an associated resource type.

A child <schedule> resource of the <CSEBase> and <remoteCSE> resources indicates a time period during which a CSE can transmit and receive a request. In addition, a child <schedule> resource of the <subscription> resource indicates a time period during which a notification can be transmitted to a receiver. In addition, a <schedule> resource linked as an mgmtLink attribute of the <cmdhNwAccessRule> resource indicates a time period during which use of a specific underlying network is allowed.

An originator has the same access control privilege to the <schedule> resource as privilege to a parent resource of the <schedule> resource.

The <schedule> resource includes attributes listed below. The attributes in which actual values are stored may be mandatorily set ("1") through multiplicity or may be optionally set ("0 . . . 1"). In addition, the attributes are set to RO (Read Only), RW (Read and Write), or WO (Write Only) according to characteristics during creation.

TABLE 2

| Attributes of <schedule> | Multiplicity | RW/RO/WO | Description |
|---|---|---|---|
| resourceType | 1 | RO | Resource Type. This Write Once (assigned at creation time and then cannot be changed) attribute identifies the type of the resource. Each resource shall have a resourceType attribute. |
| resourceID | 1 | WO | This attribute is an identifier for the resource that is used for "non-hierarchical addressing method". This attribute shall be provided by the Hosting CSE when it accepts a resource creation procedure. The Hosting CSE shall assign a resourceID which is unique in that CSE. |
| parentID | 1 | RO | The system shall assign a value to this attribute according to parameters given in a CREATE Request. It establishes the parent-child relationship by the identification of the parent of a child resource. Such identifier shall use non-hierarchical URI representation. For example, an AE resource with the identifier "myAE1" which has been created under the resource " . . . //example.com/oneM2M/myCSE", the value of the parentID attribute will contain " . . . //parentID". |
| expirationTime | 1 | RW | Time/date after which the resource will be deleted by a Hosting CSE. This attribute can be provided by an Originator and, in such a case, it will be regarded as a hint to the Hosting CSE on the lifetime of the resource. The Hosting CSE can however decide on the real expirationTime. If the Hosting CSE decides to change the expirationTime attribute value, this is communicated back to the Originator. The lifetime of the resource can be extended by providing a new value for this attribute in an UPDATE operation. Or by deleting the attribute value, e.g. by not providing the attribute when doing a full UPDATE, in which case the Hosting CSE can decide on a new value. This attribute is mandatory when specified. If the Originator does not provide a value in a CREATE operation, the system shall assign an appropriate value depending on its local policies and/or M2M service subscription agreements. |
| creationTime | 1 | RO | Time/date of creation of the resource. This attribute is mandatory for all resources and the value is assigned by the system at the time when the resource is locally created. Such an attribute cannot be changed. |
| lastModifiedTime | 1 | RO | Last modification time/date of the resource. This attribute is mandatory and its value is assigned automatically by the system each time an addressed resource is modified by means of an UPDATE operation. |
| labels | 0 . . . 1 | RO | Tokens used as keys for discovering resources. This attribute is optional and, if not present, it means that the resource cannot be found by means of a discovery procedure which uses labels as a key parameter of discovery. |

TABLE 2-continued

| Attributes of <schedule> | Multiplicity | RW/RO/WO | Description |
|---|---|---|---|
| announceTo | 0 . . . 1 | RW | This attribute may be included in a CREATE or UPDATE Request in which case it contains a list of URIs/CSE-IDs where the resource being created/updated is to be announced. This attribute shall only be present if it has been successfully announced to other CSEs. This attribute maintains the list of URIs to the successfully announced resources. Updates on this attribute will trigger new resource announcement or de-announcement. |
| announcedAttribute | 0 . . . 1 | RW | This attribute shall only be present at an original resource if some Optional Announced (OA) type attributes have been announced to other CSEs. This attribute maintains the list of announced Optional Attributes (OA type attributes) in the original resource. Updates to this attribute will trigger new attribute announcement if a new attribute is added or de-announcement if an existing attribute is removed. |
| scheduleElement | 1 (L) | RW | Expresses time periods defined by second, minute, hour, day of month, month, and year. Supports repeating periods, and wildcards expressed as a list. |

As appreciated from the above table, the schedule related resource has been developed taking into account a time period (child resources of <CSEBase> and <remoteCSE>) during which a CSE can deliver messages, a time period (a child resource of <subscription>) during which a notification message can be transmitted, and a period (a mgmtLink attribute of <cmdhNwAccessRule>) during which an underlying network is supported. Specifically, the schedule resource indicates, through "scheduleElement" a time period during which a corresponding resource can operate in a state configured as a child resource or attribute of each resource.

Meanwhile, an <AE> resource type is used to process information regarding an application. The <AE> resource type includes attributes listed below.

TABLE 3

| Attributes of <AE> | Multiplicity | RW/RO/WO | Description |
|---|---|---|---|
| resourceType | 1 | RO | See Table 2 |
| parentID | 1 | RO | See Table 2 |
| expirationTime | 1 | RW | See Table 2 |
| accessControlPolicyIDs | 0 . . . 1 (L) | RW | The attribute contains a list of identifiers (either an ID or a URI depending on if it is a local resource or not) of an <accessControlPolicy> resource. The privileges defined in the <accessControlPolicy> resource that are referenced determine who is allowed to access the resource containing this attribute for a specific purpose (e.g., Retrieve, Update, Delete, etc.). |
| creationTime | 1 | RO | See Table 2 |
| lastModifiedTime | 1 | RO | See Table 2 |
| labels | 0 . . . 1 (L) | RO | See Table 2 |
| announceTo | 0 . . . 1 | RW | See Table 2 |
| announcedAttribute | 0 . . . 1 | RW | See Table 2 |
| appName | 0 . . . 1 | RW | The name of the application, as declared by an application developer (e.g., "HeatingMonitoring"). |
| App-ID | 1 | WO | The identifier of the Application |
| AE-ID | 1 | RO | The identifier of the Application Entity |
| pointOfAccess | 0 . . . 1 (L) | RW | The list of addresses for communicating with the registered Application Entity over Mca reference point via transport services provided by Underlying Network (e.g., IP address, FQDN, or URI). This attribute shall be accessible only by the AE and a Hosting CSE. If this information is not provided, the AE should use <pollingChannel> resource. Then the Hosting CSE can forward a request to the AE without using the PoA. |

TABLE 3-continued

| Attributes of <AE> | Multiplicity | RW/RO/WO | Description |
|---|---|---|---|
| OntologyRef | 0 . . . 1 | RW | A URI of ontology used to represent information that is managed and understood by the AE. |
| nodeLink | 0 . . . 1 | RO | A URI of a <node> resource that stores node specific information. |

As appreciated in the above table, the application related resource stores and manages information regarding an application that can be registered to the CSE.

Figure 7:
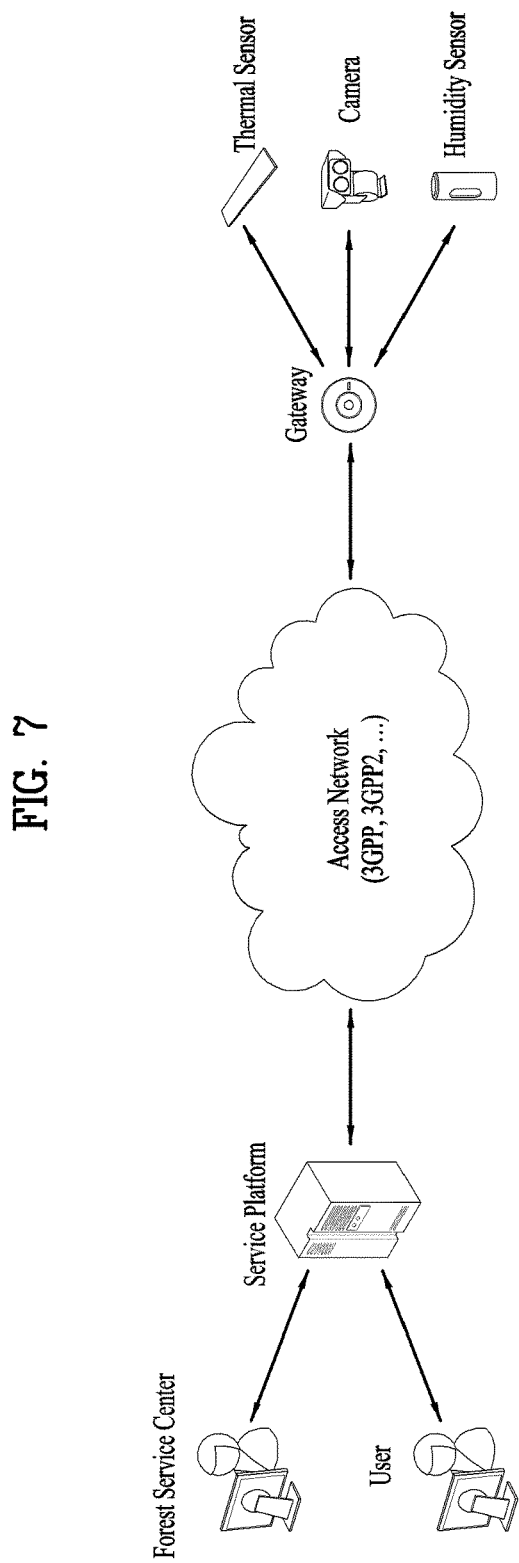
FIG. 7 illustrates an environment in which a specific M2M service is provided.

FIG. 7 illustrates an environment in which an M2M forest service is provided. Devices used for the forest service include a thermal sensor used to sense fire, a camera, and a humidity sensor. The devices used for the forest service transmit and receive data using a gateway. A forest service center or a user may receive various services by requesting the devices connected to the gateway via a service platform.

If the devices (the thermal sensor, camera, and humidity sensor) installed for the forest service in such an environment have a function capable of directly communicating with an access network, the devices may directly process data without passing through the gateway. However, in general, the devices installed for the forest service transmit generated data to the gateway using a local area network (LAN) or a personal area network (PAN) and then are connected to the access network, rather than directly storing and processing the data, due to problems such as size and cost.

Figure 8:
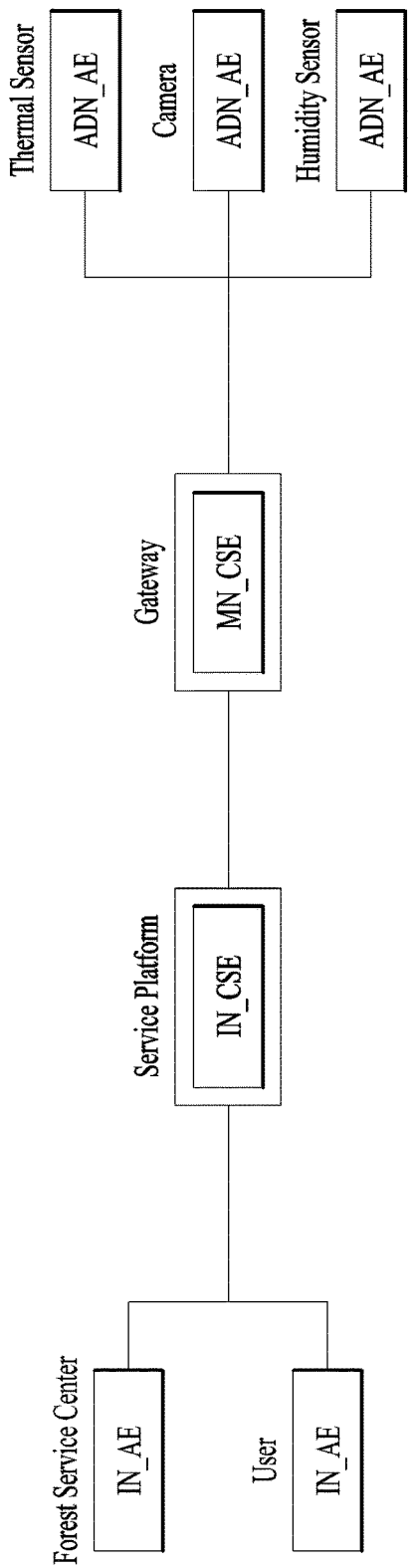
FIG. 8 illustrates the configuration of a specific M2M system.

FIG. 8 illustrates the configuration of an M2M system for such an M2M forest service.

As illustrated in FIG. 8, devices installed for the forest service may be expressed as AEs. The devices are registered to a CSE in a gateway and then provide services to a forest service center or a specific user. Particularly, the devices for the forest service are necessarily registered to a CSE in the gateway (i.e., MN_CSE) and then provide services as AEs in an ADN (i.e., ADN_AEs) without the CSE. In this case, a schedule time (e.g., a schedule resource of MN_CSE) at which the CSE can transmit and receive a message may be registered to the CSE in the gateway and services may be provided based on registered scheduling information of the CSE. Although not included in the prior art, if scheduling information for a specific AE (e.g., a schedule resource of ADN_AE) is present, services may be provided based on the scheduling information for the AE.

Figure 9:
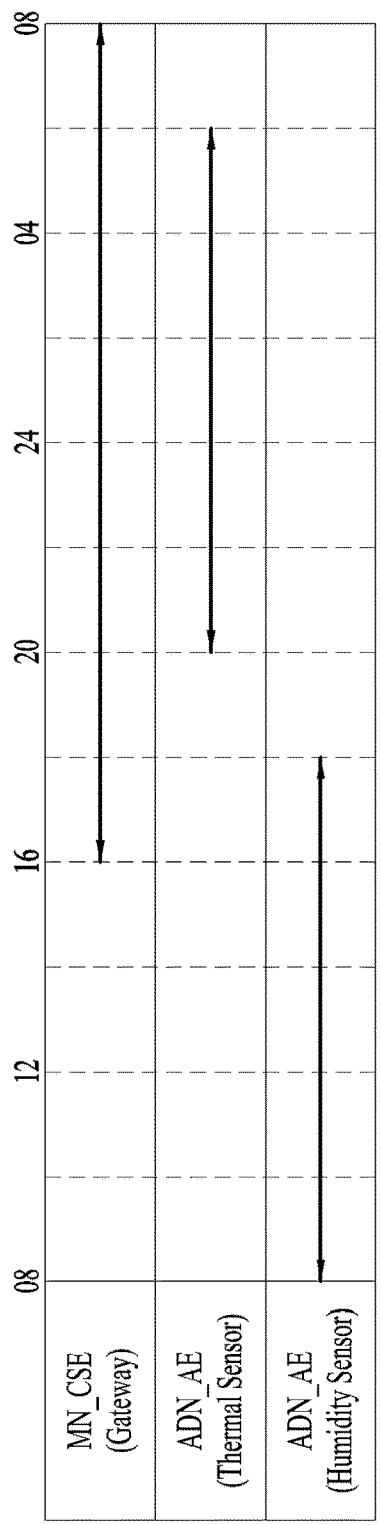
FIG. 9 illustrates scheduling information of a plurality of entities.

However, problems occur when scheduling information of the CSE of the gateway (e.g., a schedule resource of MN_CSE) does not include scheduling information of an AE of a specific device (e.g., the schedule resource of ADN_AE). This will now be described with respect to FIG. 9. For example, a situation is considered in which the gateway is configured to operate from 16:00 to 08:00 and corresponding operation information is stored in a schedule resource. Next, a thermal sensor AE and a humidity sensor AE located in a device different from the gateway are registered to the gateway. For example, the thermal sensor is configured to operate from 20:00 to 06:00 and the humidity sensor is configured to operate from 08:00 to 18:00.

First, in the case of the thermal sensor AE, since the thermal sensor AE operates only in a time period during which the scheduling information of the gateway is valid, the thermal sensor AE can provide a service without any problem. That is, since the gateway is configured to normally operate in a time period "from 20:00 to 06:00" during which the thermal sensor AE is configured to operate, the thermal sensor AE can normally provide a service. On the other hand, in the case of the humidity sensor AE, since the humidity sensor AE is configured to operate even in a time period during which the scheduling information of the gateway is not valid, even if data is generated by the humidity sensor AE from 08:00 to 16:00, the gateway cannot process the generated data.

This problem may occur in an environment in which scheduling information of a CSE is unknown when scheduling information of an AE is registered to the CSE in another device. Therefore, the present invention proposes a method for solving problems that can occur when scheduling information of the CSE and scheduling information of an AE are simultaneously present.

Although a description will be given based on an M2M system environment, the present invention is generally applicable to other systems having a client-server structure.

The present invention is devised to provide a policy related to a schedule resource and a method of managing the same.

As such, the present invention proposes a <scheduleRule> resource type as a resource configuration for managing the schedule resource. When scheduling information for an AE is registered to the CSE, the proposed <scheduleRule> resource type is used to manage the scheduling information. The proposed <scheduleRule> resource type is present as a child resource of the above-described <schedule> resource.

The <scheduleRule> resource type includes attributes listed below.

TABLE 4

| Attributes of <scheduleRule> | Multiplicity | RW/RO/WO | Description |
|---|---|---|---|
| resourceType | 1 | RO | See Table 2 |
| resourceID | 1 | WO | See Table 2 |
| parentID | 1 | RO | See Table 2 |
| expirationTime | 1 | RW | See Table 2 |
| creationTime | 1 | RO | See Table 2 |
| lastModifiedTime | 1 | RO | See Table 2 |
| labels | 0 . . . 1 | RO | See Table 2 |
| announceTo | 0 . . . 1 | RW | See Table 2 |

TABLE 4-continued

| Attributes of <scheduleRule> | Multiplicity | RW/RO/WO | Description |
|---|---|---|---|
| announcedAttribitte | 0 . . . 1 | RW | See Table 2 |
| schedulePermission | 1 | RW | Specifies identifier information (e.g., AE-ID) that can change a schedule of a CSE when a schedule for an AE is registered to the CSE. This attribute also specifies, together with the identifier information, identifier class information (e.g., urgent or bestEffort), a valid time (e.g., unlimited or Jan. 1, 2015), and the like.<br>In this case, the "valid time" indicates a time when a configured identifier can change the schedule of the CSE and the "identifier class information" indicates conditions considered when the configured identifier performs a procedure of changing the schedule of the CSE. Specifically, the identifier class information includes the following values.<br>urgent: The schedule of the CSE is changed according to scheduling information of a corresponding AE regardless of other conditions related to the schedule.<br>bestEffort: The schedule of the CSE is changed in further consideration of other conditions related to the schedule.<br>If not specified, the identifier class is set to bestEffort.<br>For example, if an emergency call AE, identifier information of which is App-Ecall, desires to change the schedule of the CSE without an additional constraint (battery, etc.), this attribute may be set to "permission = {App-Ecall, urgent, unlimited}" |
| batteryLimitation | 1 | RW | Specifies a battery limitation value at which the schedule of the CSE can be changed when the schedule for the AE is registered to the CSE. That is, the schedule of the CSE cannot be changed when a battery value is under the battery limitation value specified in this attribute. |
| addiionalCondition | 0 . . . 1 (L) | RW | Specifies an additional condition under which the schedule of the CSE can be changed when the schedule for the AE is registered to the CSE. This attribute shall be configured in a form capable of being recognized in oneM2M.<br>For example, upon considering the case in which the schedule of the CSE can be changed only in "zone_A", "additionalCondition" configures, as a link, a permitted location range (i.e., zone_A) and an address value that can refer to current location information. |
| revokeCondition | 0 . . . 1 | RW | Specifies scheduling information for returning to the schedule of the CSE and an additional operation, when a value specified in schedulePermission, batteryLimitation, or additionalCondition is not satisfied after the schedule of the CSE is changed through a procedure of registering the schedule for the AE to the CSE.<br>If this attribute is not configured, the schedule of the CSE returns to an initially set value. |

In addition, a schedule resource for an AE is proposed. An M2M service may be provided based on scheduling information of an AE and a CSE residing in a node. In a resource oriented architecture (ROA), since all information should be present in a resource, the schedule resource for the AE is proposed. The proposed resource is defined as follows and is different from a conventional schedule resource for the CSE.

A <schedule> resource for the CSE: A child <schedule> resource of <CSEBase> and <remoteCSE> resources indicates a time period during which the CSE can transmit and receive a request.

A <schedule> resource for the AE: A <AE> resource indicates a time period during which the AE of a node can be applied.

Upon considering the schedule resource for the AE in an M2M system, the <schedule> resource is added as a child resource of the <AE> resource.

Figure 10:
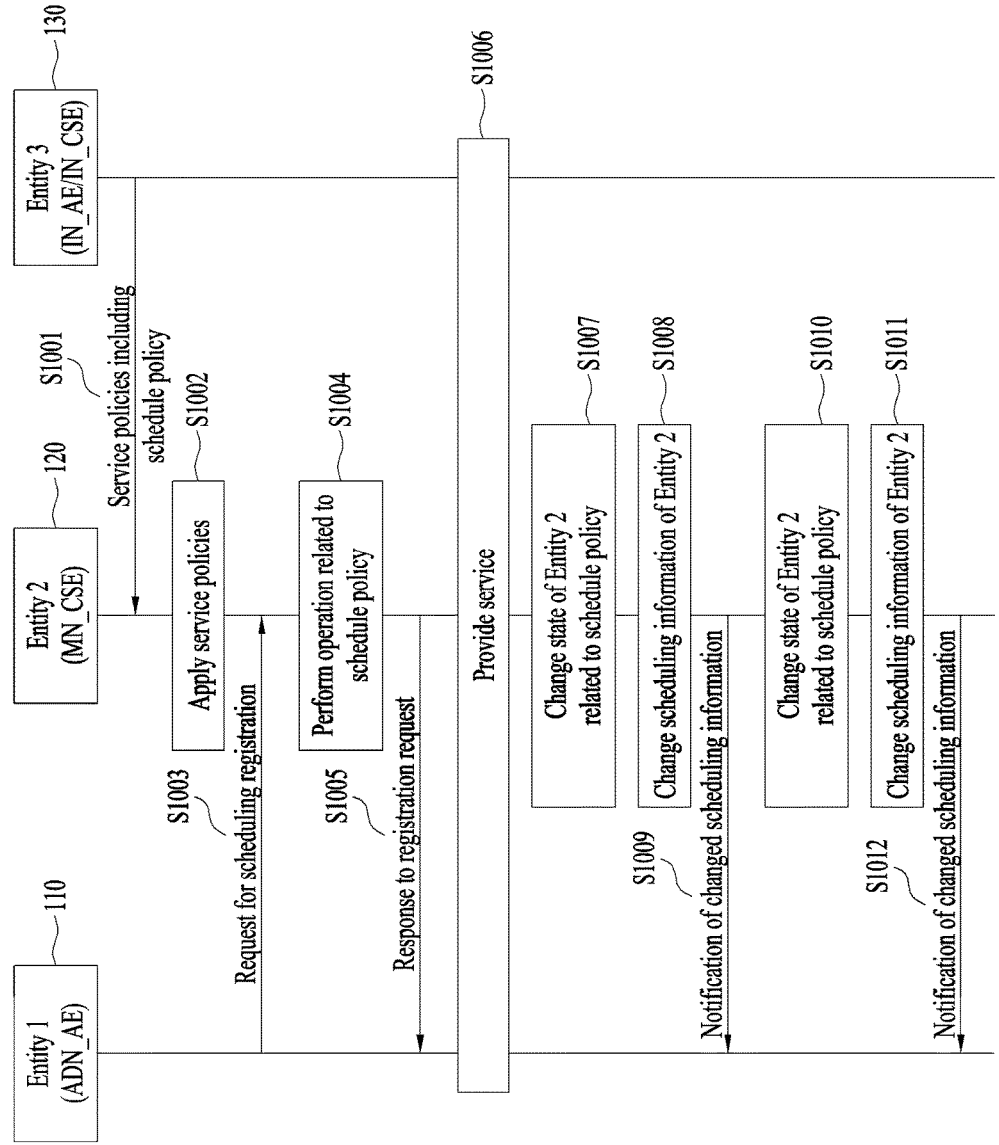
FIG. 10 illustrates a procedure of changing scheduling information according to an embodiment of the present invention.

FIG. 10 illustrates a procedure of a schedule management method for solving the aforementioned problems according to an embodiment of the present invention.

Entity 2 (120) may receive service policies assigned from Entity 3 (130) (S1001). In the present invention, Entity 3 corresponds to a service provider. Information about the service policies provided in this process contains information related to a schedule policy. The information related to the schedule policy may include identifier information capable of changing scheduling information of a CSE, a battery limitation value, and an additional setting value.

Entity 2 may apply the assigned service policy (S1002). In the present invention, Entity 2 corresponds to a gateway configured for a service. In this process, Entity 2 may register various service policies transmitted by Entity 3 in a resource thereof. Particularly, the information related to the schedule policy (i.e., the identifier information capable of changing scheduling information of the CSE, the battery limitation value, and setting values under an additional condition and during schedule change) may be registered to the "schedulePermission", "batteryLimitation", and "additionalCondition", and "revokeCondition" attributes of the aforementioned <scheduleRule> resource.

Entity 1 may request that Entity 2 perform schedule registration (S1003). In the present invention, Entity 1 indicates an AE of an ADN (i.e., ADN-AE) (e.g., the aforementioned thermal sensor AE, humidity sensor AE, etc.) located in a device different from Entities 2 and 3.

Entity 2 may perform an operation related to the schedule policy (S1004). In this case, the information related to the schedule policy may be changed. A detailed description of step S1004 will be given with reference to FIG. 11.

After performing the operation related to the schedule policy, Entity 2 may transmit a response message to the registration request, including a result of performing the operation related to the schedule policy, to Entity 1 (S1005). A detailed description of step S1005 will be given with reference to FIG. 11.

A service may be provided according to a registered schedule (S1006).

While the service is provided, the state of Entity 2 or Entity 1, related to the schedule policy, may be changed to a value exiting a criterion set in S1001 (S1007). Examples of step S1007 in relation to "schedulePermission", "batteryLimitation", and "additionalCondition" are described below.

A. schedulePermission: If "schedulePermission" specifies that "User_A" can change scheduling information of a CSE until "Jan. 1, 12:00, 2015", step S1007 indicates a time after "Jan. 1, 12:00, 2015".

B. batteryLimitation: If "batteryLimitation" specifies that a minimum battery value capable of changing the scheduling information of the CSE is 10%, step S1007 indicates a time when the capacity of a battery of Entity 2 falls below 10%.

C. additionalCondition: If "additionalCondition" specifies the scheduling information of the CSE can be changed only in "zone_A", step S1007 indicates a time when a location information value exits "zone_A".

Entity 2 may change scheduling information thereof according to change of the state (S1008). In this case, changed scheduling information and an additional operation are specified in the "revokeCondition" attribute of the <scheduleRule> resource. Examples of S1008 are described below.

A. schedulePermission: If Entity 3 specifies that "revokeCondition" which is changed when a schedule of the CSE is restored by an identifier indicated by the "schedulePermission" attribute is "initial schedule set by a service provider (e.g., from 9:00 to 18:00 every day)" and "transmission of a notification message to Entity 1", Entity 2 may change the CSE schedule thereof to "from 9:00 to 18:00 every day" when "Jan. 1, 12:00, 2015" has passed in step S1008 and transmit the notification message to Entity 1.

B. batteryLimitation: If Entity 3 specifies that "revokeCondition" which is changed when the schedule of the CSE is restored by the "batteryLimitation" attribute is "from 9:00 to 18:00, Monday to Friday" and "no additional operation", Entity 2 only changes the CSE schedule thereof to "from 9:00 to 18:00, Monday to Friday" at a time when the capacity of a battery is below 10% in S1008 and perform no additional operation.

C. additionalCondition: Entity 3 specifies that "revokeCondition" which is changed when the schedule of the CSE is restored by the "additionalCondition" attribute is "from 9:00 to 18:00, Monday/Wednesday/Friday" and "no additional operation", Entity 2 only changes the CSE schedule thereof to "from 9:00 to 18:00, Monday/Wednesday/Friday" at a time when the location information value exits "zone_A" in S1008 and performs no additional operation.

Entity 2 may notify Entity 1 of the changed scheduling information (S1009).

An attribute value related to the schedule policy in Entity 2 may be changed to a value satisfying the criterion set in S1001 (S1010). This process is opposite to the case of step S1007.

Entity 2 may change scheduling information thereof (S1011). In this case, the changed scheduling information is the same as the scheduling information changed in step S1004.

Entity 2 may notify Entity 1 of the changed scheduling information (S1012).

Figure 11:
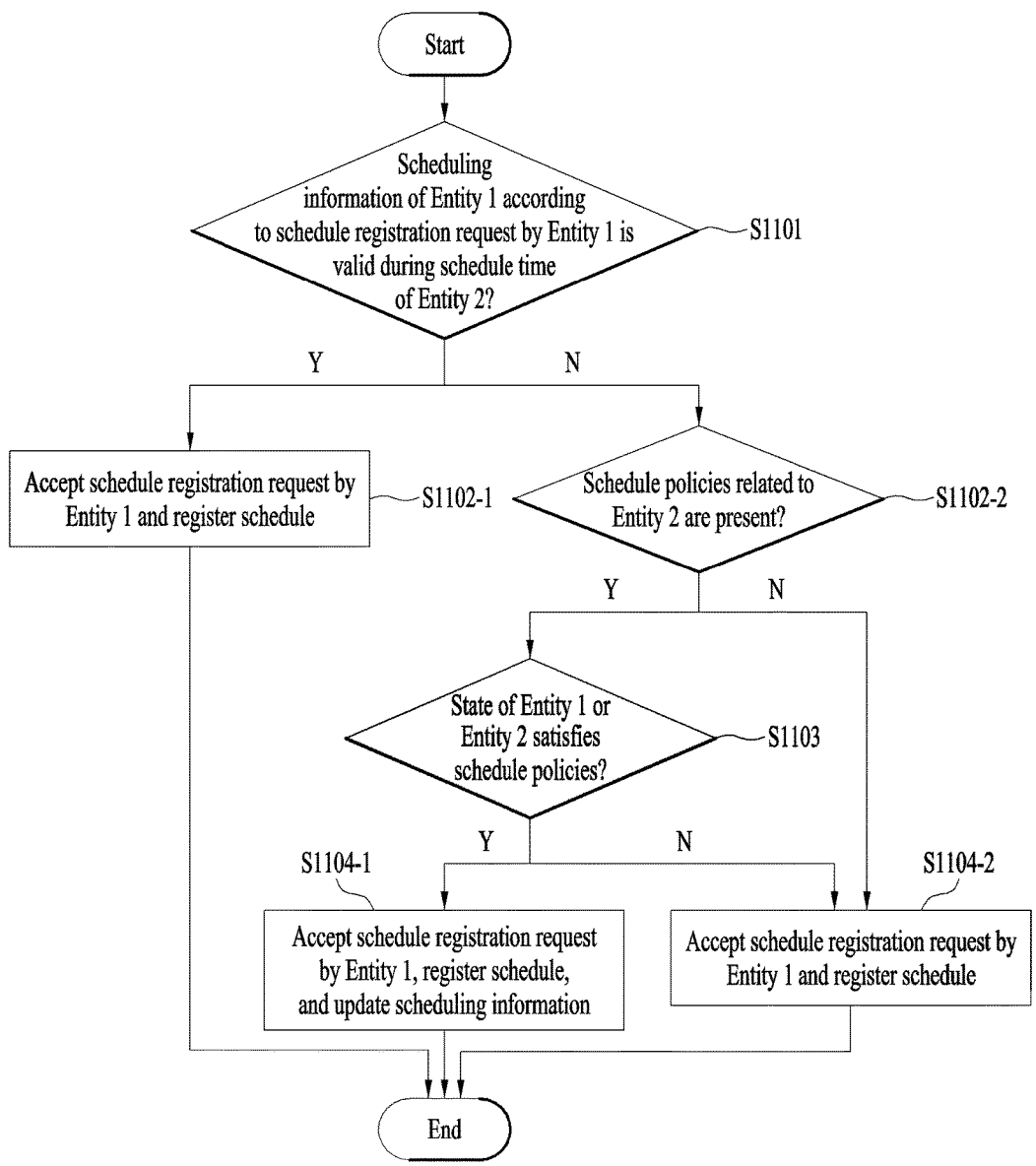
FIG. 11 illustrates a procedure of changing scheduling information according to an embodiment of the present invention.

FIG. 11 illustrates a procedure of a schedule policy related operation of Entity 2.

Entity 2 (CSE) confirms whether scheduling information for which schedule registration is requested by Entity 1 (AE) is valid during a schedule time thereof (values storing attributes of a <schedule> resource that is present as a child resource of <CSEBase>) (S1101). In step S1101, the meaning that a schedule from Entity 1 is valid during the schedule time of Entity 2 indicates that a schedule operation time of Entity 1 is set only during a schedule operation time of Entity 2. Accordingly, if all scheduling information of Entity 1 is included in scheduling information of Entity 2, the procedure proceeds to S1102-1 and, otherwise, the procedure proceeds to S1102-2.

Entity 2 may accept the schedule registration request by Entity 1 (S1102-1). Entity 2 may register the schedule according to the schedule registration request. In this case, Entity 2 may transmit a response message indicating that the registration requested scheduling information has been normally registered to Entity 1 (see S1005 of FIG. 10).

Entity 2 may confirm whether schedule policies configured to manage the schedule are present (S1102-2). This serves to confirm whether the "schedulePermission", "batteryLimitation", and "additionalCondition" attributes of the <scheduleRule> resource are present.

If the schedule policies are present, Entity 2 proceeds to S1103 and, if not, Entity 2 proceeds to S1104-2.

Entity 2 confirms whether the state of Entity 2 or Entity 1 satisfies the schedule policies configured in the <scheduleRule> resource (S1103). That is, Entity 2 may check the state thereof or the state of Entity 1 with respect to the "schedulePermission", "batteryLimitation", or "additional Condition" attribute.

A. schedulePermission: If it is specified that "User_A" can change scheduling information of a CSE according to an identifier class of "bestEffort" until "Oct. 31, 12:00, 2010", Entity 2 confirms, in step S1103, whether an ID of Entity 1 is "User_A" and whether a current time is before "Oct. 31, 12:00, 2010".

B. batteryLimitation: If it is specified that a minimum battery value at which change of the scheduling information of the CSE can be performed is 10%, Entity 2 confirms whether the capacity of a battery of Entity 2 is currently above 10% in step S1103.

C. additionalCondition: If it is specified that the scheduling information of the CSE can be changed only in "zone_A", Entity 2 confirms whether a current location information value is "zone_A" in step S1103.

If a corresponding schedule policy is satisfied as a result of performing step S1103, Entity 2 proceeds to S1104-1 and, if not, Entity 2 proceeds to S1104-2.

Entity 2 may update the scheduling information thereof and accept the schedule registration request by Entity 1 (S1104-1). Entity 2 may register the schedule according to the schedule registration request. In this case, Entity 2 may transmit the response message indicating that the scheduling information has been normally registered to Entity 1 (see S1005 of FIG. 10). In this case, the updated scheduling information of Entity 2 may be added to a value configured by an initial service provider.

For example, if step S1104-1 is performed in a situation in which the scheduling information of Entity 2 indicates from 10:00 to 24:00 and the scheduling information of Entity 1 indicates from 8:00 to 10:00, the scheduling information of Entity 2 is changed from 8:00 to 24:00.

Even though a corresponding schedule policy is not satisfied as a result of performing step S1103, Entity 2 may accept the request by Entity 1 (S1104-2). Entity 2 may register the schedule according to the schedule registration request. However, in this case, although the scheduling information requested by Entity 1 has been registered, Entity 2 may transmit a response message including information about a schedule period during which Entity 2 does not operate to Entity 1 (see S1005 of FIG. 10).

In this way, when schedules of two different entities are not equal or collide, change of scheduling information is performed within the range of a schedule policy that the CSE permits and, thus, a time period during which all M2M services can be provided can increase. In addition, since the schedule of the CSE can be dynamically changed, resources (e.g., a battery) can be saved.

Figure 12:
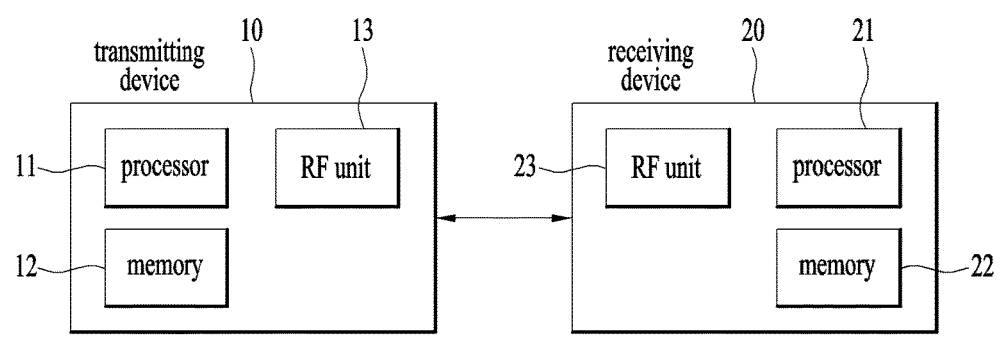
FIG. 12 is a block diagram of apparatuses for implementing embodiment(s) of the present invention.

FIG. 12 is a block diagram of a transmitting device 10 and a receiving device 20 configured to implement exemplary embodiments of the present invention. Referring to FIG. 12, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

In the embodiments of the present invention, application (entity) or resource related entity etc. may operate as devices in which they are installed or mounted, that is, a transmitting device 10 or a receiving device 20.

The specific features of the application (entity) or the resource related entity etc. such as the transmitting device or the receiving device may be implemented as a combination of one or more embodiments of the present invention described above in connection with the drawings.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a terminal, a base station, a server, or other apparatuses.

The invention claimed is:

1. A method for changing scheduling information in a wireless communication system, the method being performed by a first machine-to-machine (M2M) device and comprising:
   receiving a registration request of scheduling information for a specific application from a second M2M device;
   when the scheduling information for the specific application is not included in the scheduling information of the first M2M device, checking whether a policy related to the scheduling information of the first M2M device is present;
   when the policy is present, determining whether states of the first M2M device and the second M2M device satisfy the policy; and
   when the states of the first M2M device and the second M2M device satisfy the policy, updating the scheduling information of the first M2M device,
   wherein the policy related to the scheduling information of the first M2M device includes schedulePermission including information for an identifier of an entity having privilege to change the scheduling information of the first M2M device, a class of the identifier, or a time when the entity can change the scheduling information, batteryLimitation including information for a battery state value of the first M2M device which can change the scheduling information, or additionalCondition including information for an additional condition under which the scheduling information can be changed, and
   wherein the class of the identifier includes a first class and a second class, the entity having the identifier of the first class can change the scheduling information without considering a policy related to other scheduling information, and the entity having the identifier of the second class can change the scheduling information in consideration of the policy related to the other scheduling information.

2. The method according to claim 1, wherein the policy related to the scheduling information of the first M2M device includes revokeCondition including information for the scheduling information of the first M2M device that is to be changed when the states of the first M2M device and the second M2M device do not satisfy the policy after the scheduling information of the first M2M device is updated based on the registration request.

3. The method according to claim 1, further comprising:
   when the scheduling information for the specific application is included in the scheduling information of the first M2M device, accepting the registration request and transmitting, to the second M2M device, a response message indicating that the scheduling information for the specific application has been registered based on the registration request.

4. The method according to claim 1, further comprising:
   when the states of the first M2M device and the second M2M device do not satisfy the policy or the policy is not present, accepting the registration request and transmitting a response message including information for a period during which the first M2M device does not operate.

5. The method according to claim 2, further comprising:
   when the states of the first M2M device and the second M2M device do not satisfy the policy after the scheduling information of the first M2M device is updated based on the registration request, changing the scheduling information of the first M2M device based on the revokeCondition.

6. A machine-to-machine (M2M) device for changing scheduling information in a wireless communication system, the M2M device comprising:
   a receiver and a transmitter; and
   a hardware processor that controls the receiver and the transmitter,
   wherein the hardware processor:
   receives a registration request of scheduling information for a specific application from a peer M2M device,
   when the scheduling information for the specific application is not included in the scheduling information of the M2M device, checks whether a policy related to the scheduling information of the M2M device is present,
   when the policy is present, determines whether states of the M2M device and the peer M2M device satisfy the policy, and
   when the states of the M2M device and the peer M2M device satisfy the policy, updates the scheduling information of the M2M device,
   wherein the policy related to the scheduling information of the M2M device includes schedulePermission including information for an identifier of an entity having privilege to change the scheduling information of the M2M device, a class of the identifier, or a time when the entity can change the scheduling information, batteryLimitation including information for a battery state value of the M2M device which can change the scheduling information, or additionalCondition including information for an additional condition under which the scheduling information can be changed, and
   wherein the class of the identifier includes a first class and a second class, the entity having the identifier of the first class can change the scheduling information without considering a policy related to other scheduling information, and the entity having the identifier of the second class can change the scheduling information in consideration of the policy related to the other scheduling information.

7. The M2M device according to claim 6, wherein the policy related to the scheduling information of the M2M device includes revokeCondition including information for the scheduling information of the M2M device that is to be changed when the states of the M2M device and the peer M2M device do not satisfy the policy after the scheduling information of the M2M device is updated based on the registration request.

8. The M2M device according to claim 6, wherein, when the scheduling information for the specific application is included in the scheduling information of the M2M device, the hardware processor accepts the registration request and transmit, to the peer M2M device, a response message indicating that the scheduling information for the specific application has been registered based on the registration request.

9. The M2M device according to claim 6, wherein, when the states of the M2M device and the peer M2M device do not satisfy the policy or the policy is not present, the hardware processor accepts the registration request and transmit a response message including information for a period during which the M2M device does not operate.

10. The M2M device according to claim 7, wherein, when the states of the M2M device and the peer M2M device do not satisfy the policy after the scheduling information of the M2M device is updated based on the registration request, the hardware processor changes the scheduling information of the M2M device based on the revokeCondition.

* * * * *